United States Patent [19]
Ciuffi et al.

[11] Patent Number: 6,086,019
[45] Date of Patent: Jul. 11, 2000

[54] SYSTEM FOR EXTRACTION AND UNFOLDING OF RESERVE PARACHUTE

[75] Inventors: Attilio Ciuffi; Stefano Di Giorgio, both of Aprilia, Italy

[73] Assignee: Irvin Aerospace S.p.A., Aprilia, Italy

[21] Appl. No.: 09/040,531

[22] Filed: Mar. 18, 1998

[51] Int. Cl.[7] .................................................. B64D 17/54
[52] U.S. Cl. ........................................................... 244/149
[58] Field of Search ................................... 244/147, 148, 244/149, 151 R, 152

[56] References Cited

U.S. PATENT DOCUMENTS

| | | | |
|---|---|---|---|
| 2,405,333 | 8/1946 | Sheridan | 244/151 A |
| 3,765,627 | 10/1973 | Snyder | 244/151 A |
| 4,262,865 | 4/1981 | Smith | 244/151 A |
| 4,898,346 | 2/1990 | Ertler | 244/148 |
| 5,253,826 | 10/1993 | Coltman et al. | 244/148 |

*Primary Examiner*—Galen L. Barefoot
*Attorney, Agent, or Firm*—Smith, Gambrell & Russell, LLP

[57] ABSTRACT

The present invention relates to a system for the extraction and unfolding of the reserve parachute employable both for a ventral and a dorsal configuration. The system provides for the forced extraction of the reserve parachute by the main parachute, and an auxiliary harness to maintain the main parachute connected to the parachutist also after an anomalous situation arises without interference with the reserve parachute. The system also includes an assembly for the forced extraction and unfolding of the reserve parachute in case of a non-opening or failed extraction of the main parachute.

13 Claims, 4 Drawing Sheets

FIG. 4a
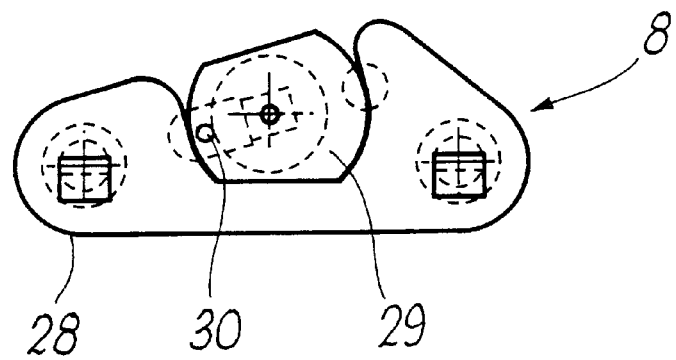
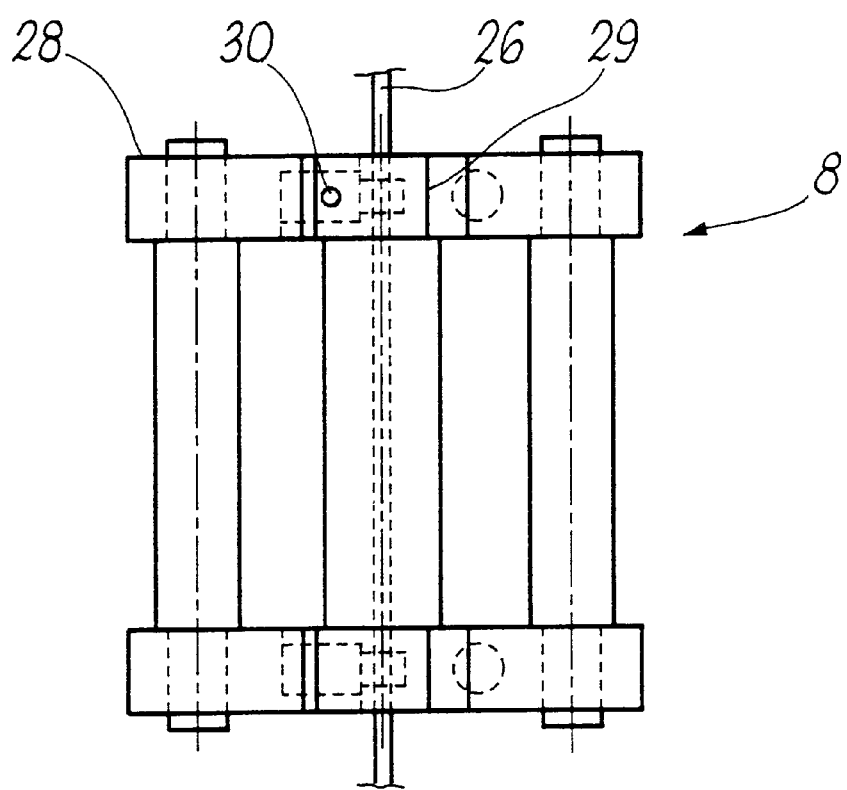
FIG. 4b

SYSTEM FOR EXTRACTION AND UNFOLDING OF RESERVE PARACHUTE

The present invention relates to an improved system for extraction and unfolding of a reserve parachute.

More particularly, the invention relates to a system of the above kind allowing the extraction of the reserve parachute by a combined action of elastic separation elements (ejection spring) and of the main parachute, without losing the connection between the parachutist and the main parachute, the latter contributing, even if with a reduced active surface, to further reduce the descent speed.

The solution suggested according to the present invention is particularly suitable for situations like the military parachutists launch, where the reaction times to a possible failure of the main parachute are extremely short.

As it is well known, due to the equipment usually worn by the parachutist during an operative launch, the capability of the man to react to eventual interference that could occur after the operation of the reserve parachute both for the main parachute and for the parachutist or his equipment is significantly reduced.

Due to this reason, it is essential to have a reliable, dynamic unfolding of the reserve parachute, to maximize the success probability of the emergency maneuver.

Another important feature is the possibility of activating the sequence by a single control available to the parachutist.

The arrangements of parachute assemblies for parachute jumps are substantially divided into two classes:

- a completely back provided assembly, wherein the main and reserve parachutes are both provided behind the parachutist; and
- assemblies providing a rear main parachute and a front reserve parachute.

If the extraction of the reserve parachute is autonomous, a series of drawbacks can be present, such as:

- difficulties in unfolding and opening at a speed between 8 and 10 m/sec, usually associated with a partial functioning of the main parachute, situations which, even if not lethal, can subject the parachutist to trauma and can therefore prevent the parachutist from operating upon reaching the ground.

Said unfolding difficulty is common to reserve parachutes when operated both by an elastic separation element and pilots, due to the low dynamic pressure deriving from the rather low descent speed.

What is usually observed during these situations is an uncertainty during the unfolding and opening steps, thus giving a slowness of the sequence, and a high interference probability of the reserve parachute.

After the ejection, the canopy tends to fall down and then lifts up again both for the floating in the aerodynamic stream and for the dragging by the pilot parachute, leading to trajectories having a high probability of interference with the parachutist and the equipment worn by the same, particularly in a case of even low lateral wind;

There also exists a high interference probability between the reserve parachute and the main parachute for systems controlled by ejection pilot and involving a fall speed higher than 10 m/sec, which is typical for more serious or total malfunctioning of the main parachute.

In fact, in these conditions, the action of the pilot parachute is particularly fast and efficient, because the inflating of the same occurs very fast and therefore as soon as it exits the housing, and follows trajectories oriented through the relative aerodynamic stream so as to be very close and aligned with respect to the textile elements of the main parachute (shroud lines) close to the parachutist. This introduces a high probability of interference with the same. In fact, penetration of the pilot parachute is a relevant probabilistic eventuality remarkably reducing, in the fall speed range taken into consideration, the efficiency of the reserve parachute.

Additional interference possibilities are found in the rope unfolding of the reserve parachute, with the numerous grips provided by the metallic parts of the harness, by the equipment and finally with the parachutist.

Said interference aspects with respect to the equipment and with the parachutist occur with any fall speed (but particularly with low speed) and for any operation system of the reserve parachute (extractor pilot or ejection spring), being due to the position of the storing loops of the shroud lines of the reserve parachute (usually housed on the bottom of the housing fixed to the harness of the parachutist) and to the fact that distension of the same fascio occurs by sliding of the ropes, for the complete length of the same close to or on the parachutist.

In an effort to solve the above drawbacks, the present invention features an extraction and unfolding system for the reserve parachute which provides for the extraction of the reserve parachute by a combined action of elastic separation elements (ejection spring) and by the same main parachute, without losing the connection between the main parachute and the parachutist, and without introducing, with the same connection, a possible interference element with the reserve parachute.

The main parachute contributes, even with a very reduced active surface, to a reduction in the descent speed.

The system according to the invention provides different embodiments for achieving the relative positioning of the main parachute with respect to the reserve parachute.

In function of the above arrangements, the actuation mechanism for the release of the main parachute and the activation of the reserve parachute can be different for the realizative detail of the mechanisms or with regard to the special decomposable links necessary for the realization of the sequence. Generally speaking, a completely back configuration is structurally simpler, mainly when both the main and reserve parachutes are housed in a single specialized housing into two compartments, and therefore they are not managed as separated units.

Many sport parachute configurations feature a control provided to the parachutist for provoking the definitive release of the main parachute, causing the extraction and the unfolding of the reserve parachute.

In arrangements where the main parachute is provided on the backside and the reserve parachute is provided on the front side, usually employed for the launch of military parachutists, the realization of the sequence by a sole command involves sophisticated complex architectures and integrative solutions, as well as the use of special decomposable links characterized by high reliability and very low actuation stresses.

Particularly, release is obtained by a different architecture in the housing of the reserve parachute or in the harness upon which the main and reserve parachutes are abutted.

In case the extraction action by the main parachute is not available (e.g. for the effect of the lack of the extraction of the main parachute for example due to the breaking of the restraint rope with the aeroplane), the system exploits the extraction action of an auxiliary pilot parachute, as in any conventional system.

The combined action of the above mentioned elements qualifying the system according to the invention, provides a reliable and fast distension of the reserve parachute in any emergency situation eventually occurring during a launch.

It is therefore a specific object of the present invention to provide a system for the extraction and unfolding of the reserve parachute involving means for the forced extraction of the reserve parachute by the main parachute, means to maintain the main parachute connected to the parachutist after its anomalous opening without creating interference with the reserve parachute, and means for the forced extraction and unfolding of the reserve parachute in case of non-opening or failed extraction of the main parachute.

Preferably, according to the invention, said means to maintain the main parachute connected to the parachutist after its anomalous opening can be comprised of an auxiliary harness which, all along the contact zone with the reserve parachute, joins the hooking harnesses into a double Y-shaped configuration thus avoiding any possible interference with the canopy of the reserve parachute, prejudicial to the inflation of the same.

In a preferred embodiment of the system according to the invention, which is particularly suitable for an arrangement providing the reserve parachute in a ventral position, there is provided an outer housing having edges that can be opened, a dismountable inner housing, the latter containing the reserve parachute, the shroud lines of the same parachute, the means to maintain the main parachute connected to the parachutist in case of activation of the reserve parachute, thus avoiding prejudicial interference with the same reserve parachute, said inner housing being frontally opened to allow the exit by the simple traction action of the apex by a pilot parachute.

Preferably, according to the invention, said double housing system provides for the extraction of the reserve parachute either by a pilot parachute extracted by spring means or by forced extraction of the inner housing actuated by the release and by the consequent dragging by the main parachute and involving a double Y-shaped harness avoiding prejudicial interference in the opening of the reserve parachute.

Still according to the invention, said inner housing sustains the housing of the shroud lines of the main parachute in such a way that the same, during distension, has no sliding with respect to the parachute.

According to the invention, on the outer housing control, means are provided, operable by both hands of the parachutist, for activating a first couple of decomposable links, thus realizing the release of the main canopy and the opening of the closure edges.

Furthermore, according to the invention, the harness provides the structural closure of the band elements comprising the same with respect to the suspension of the main parachute, through the series connection of the counter shoulder-straps with the outer structure of the reserve parachute.

Still according to the invention, said harness provides removable counter shoulder-straps allowing the release of the main parachute by a single command opening the edges of the outer housing of the first couple of decomposable links housed within the same and by the release of the front terminals of the counter shoulder-straps, the automatic activation of a second couple of rear decomposable links provided on the terminals.

Preferably, according to the invention, said first couple of decomposable links provides check means of the buckle, for each link, said means being comprised of two catenary branches, obliged to slide within a converging guide, and having the sliding put on hold by a couple of connecting rods pivoted on the centre according to dead point geometry. The mechanism in the closure position is maintained in a safety condition by a triangularly shaped floating plate means maintained in position by a slider, with said slider, when in the central position, preventing any motion of the check floating plate check means.

Particularly, said floating plate means can provide three feeler pins engaging with the body of the link, two of which are configured in such a way as to be able to intercept the slider during its right or left translatory motion, and with the central pin controlling the closure position of the connecting rod as well as defining the sliding trajectory of the two branches of the catenary.

Preferably, each one of said second pair of rear decomposable links can be comprised of a metallic body against which shoulder bands of the harness are abutted, and where a pin having eccentric supports is housed, mounted on the rear band terminal of the over shoulder-strap.

Particularly, according to the invention, the mounting position of said eccentric pin is ensured by floating cylindrical pegs maintained within the seat by the peg assembly comprised of the core of a bowden cable integrated with said shoulder-straps.

BRIEF DESCRIPTION

The present invention will be now described, for illustrative but not limitative purposes, according to its preferred embodiments, with particular reference to the figures of the enclosed drawings, wherein:

FIGS. 4a and 4b are respectively a top view and a lateral view of a second rear provided dismountable link of the system according to the invention.

DETAILED DESCRIPTION

Referring to the figures of the enclosed drawings, it is shown, in illustrative way, an embodiment of the system according to the invention described according to its activation logic relevant to a configuration of a reserve parachute, ventrally positioned, particularly suited for military use.

This embodiment maintains all the training and use features of known systems, not requiring of the parachutist any change in operative behavior.

Figure 1:
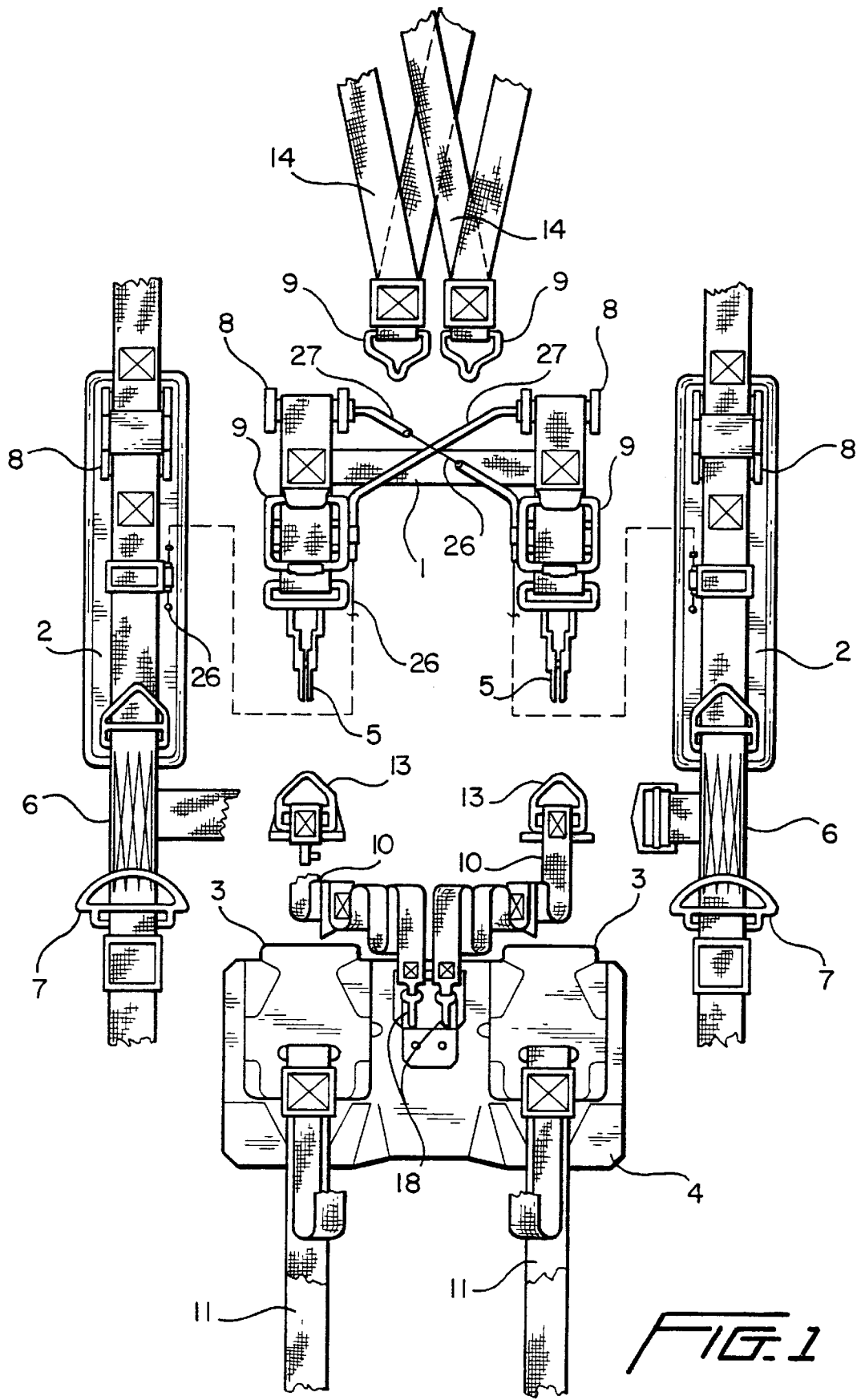
FIG. 1 is an exploded schematic view of an embodiment of the extraction and unfolding system of the reserve parachute according to the invention.

According to the embodiment schematically shown in the figure, and particularly in FIG. 1, both the main parachute and the reserve parachute are mounted on a harness suitably modified in correspondences of the coupling to the decomposable links upon which the main parachute is inserted.

Particularly, said attachment are mounted on over shoulder-straps 1 connected to the harness 2.

The connection of the over shoulder-straps 1 with the harness 2 occurs frontally, by a couple of decomposable links 3, housed within the housing 4 of the reserve parachute. The housing 4 of the reserve parachute upon which the front terminals 5 of the over shoulder-straps are inserted thus guarantees the closure of the circuit of the bearing bands 6 of the harness 1 at the level of the ventral hooks 7 for the connection of the reserve parachute.

Said over shoulder straps 1 are connected on the rear to the harness 2 by a couple of decomposable links 8 the opening of which is automatically actuated by the release of the front terminals 5.

The main parachute, mainly connected by the dismountable links 9 provided on the over shoulder-straps 1, remains connected to the harness 2 also by a double Y-shaped auxiliary harness 10 approximately long as the shroud lines of the reserve parachute.

Figure 2:
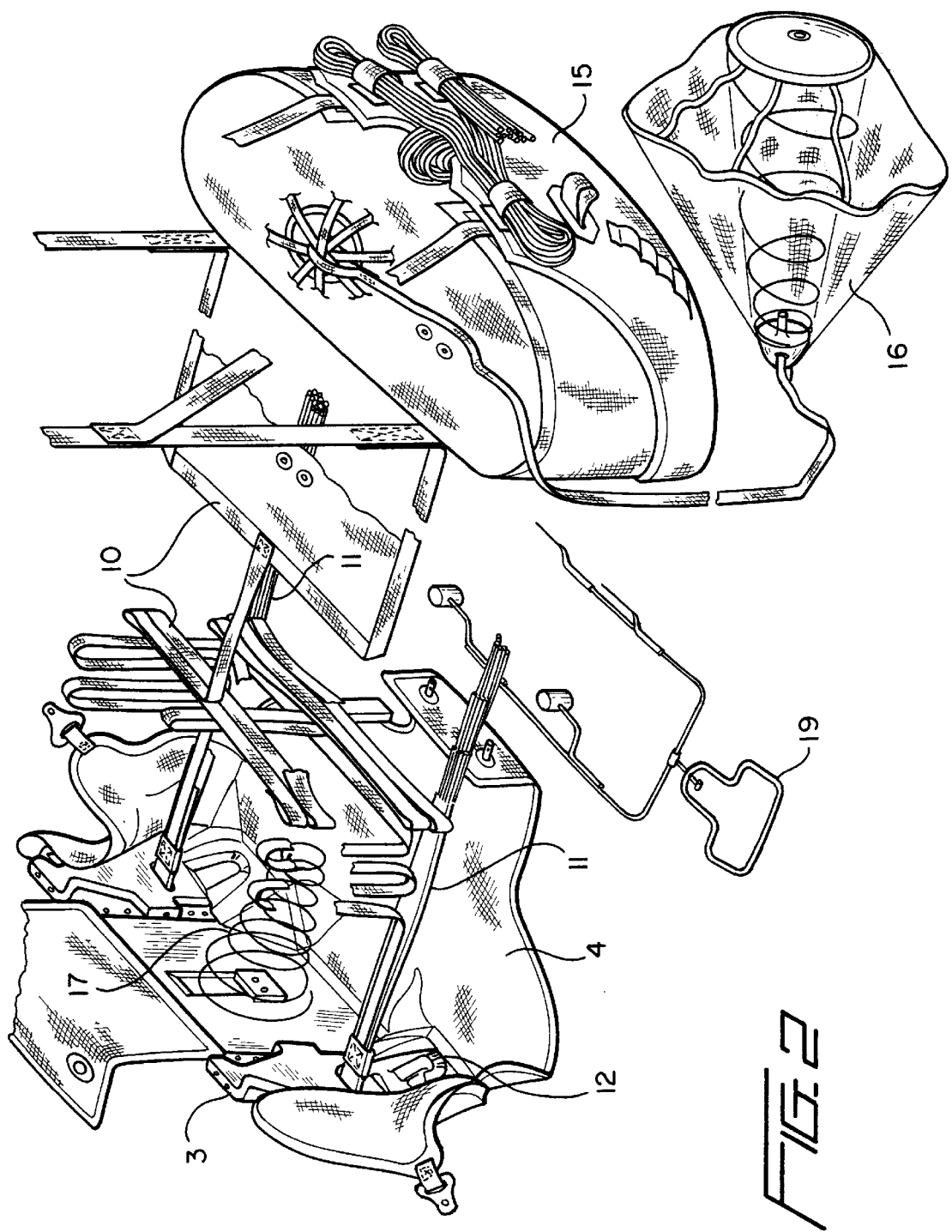
FIG. 2 is an exploded schematic view of a detail of the system of FIG. 1.

Said doable Y-shaped auxiliary harness 10, housed within the housing of the reserve parachute, ends at the bottom on the harnesses 11 of the reserve parachute at the level of the fixing hooks 12 (FIG. 2) on the ventral D-shaped hooks 7, and at the top is fixed to the buckles 13 engaged on the decomposable links 3; thus it remains rigidly connected to the terminals hooks 5 of the over shoulder-straps 1 and thus to the harnesses 14 of the main parachute.

The release of the main parachute during the flying by the parachute, at the level of the decomposable links 3 provided on the reserve parachute induces the extraction and the extension of said auxiliary harness 10, which continues to ensure a structural connection with the harness 2.

The particular double Y shaping avoids the penetration of the canopy of the reserve parachute (typical of the traditional configurations on the shroud lines of the main parachute) between the suspension harnesses, with a complete working reliability of the reserve parachute.

The reserve parachute is folded into an auxiliary housing 15 (FIG. 2) which is housed within the edges that can be opened housing 4 of the reserve parachute.

Said auxiliary housing 15 is shaped in such a way to remain frontally open to allow the exit of the canopy of the reserve parachute caused by the traction of a pilot parachute 16, and it is ejected like a closed package by a spring 17 provided on the rear in correspondence of the housing 4 cleared from suitable check dowels 18 disengaged by the release of the buckles 13 on the decomposable links 3.

The operation of the whole system occurs by a manual and voluntary command by the parachutist, by the traction of a suitable handle 19 (right or left) laterally provided on the housing 4 of the reserve parachute.

The operation of the manual control provokes at the same time the opening of the edges of the outer housing 4, the opening of the decomposable links 3, the release of the front terminals 5 of the over shoulder-straps 1, the consequent disassembling of the rear links 8 and therefore the release of the same over shoulder-straps 1 and consequently of the main parachute.

The release mechanism as an assembly is comprised of a series of four decomposable links (3; 8), the pair of links 3 is provided on the bottom of the housing 4 of the reserve parachute, and the pair of links 8 is provided on the harness 2 for the fixing of the rear terminals 5 of the above mentioned over shoulder-straps.

These links 3, 8 are functionally connected, this meaning that the clearing of the decomposable links 3 of the housing 4 provokes the release of the front terminals 5 of the over shoulder-straps 1 and subsequently actuates the disassembling of the decomposable links 8 abutted on the rear terminals.

The pair of decomposable links 3 integrated on the bottom of the housing 4 of the reserve parachute are characterized by a very low actuation force, even if actuated under traction, fundamental characteristic for the use of an actuation mechanism in an emergency situation.

Figure 3:
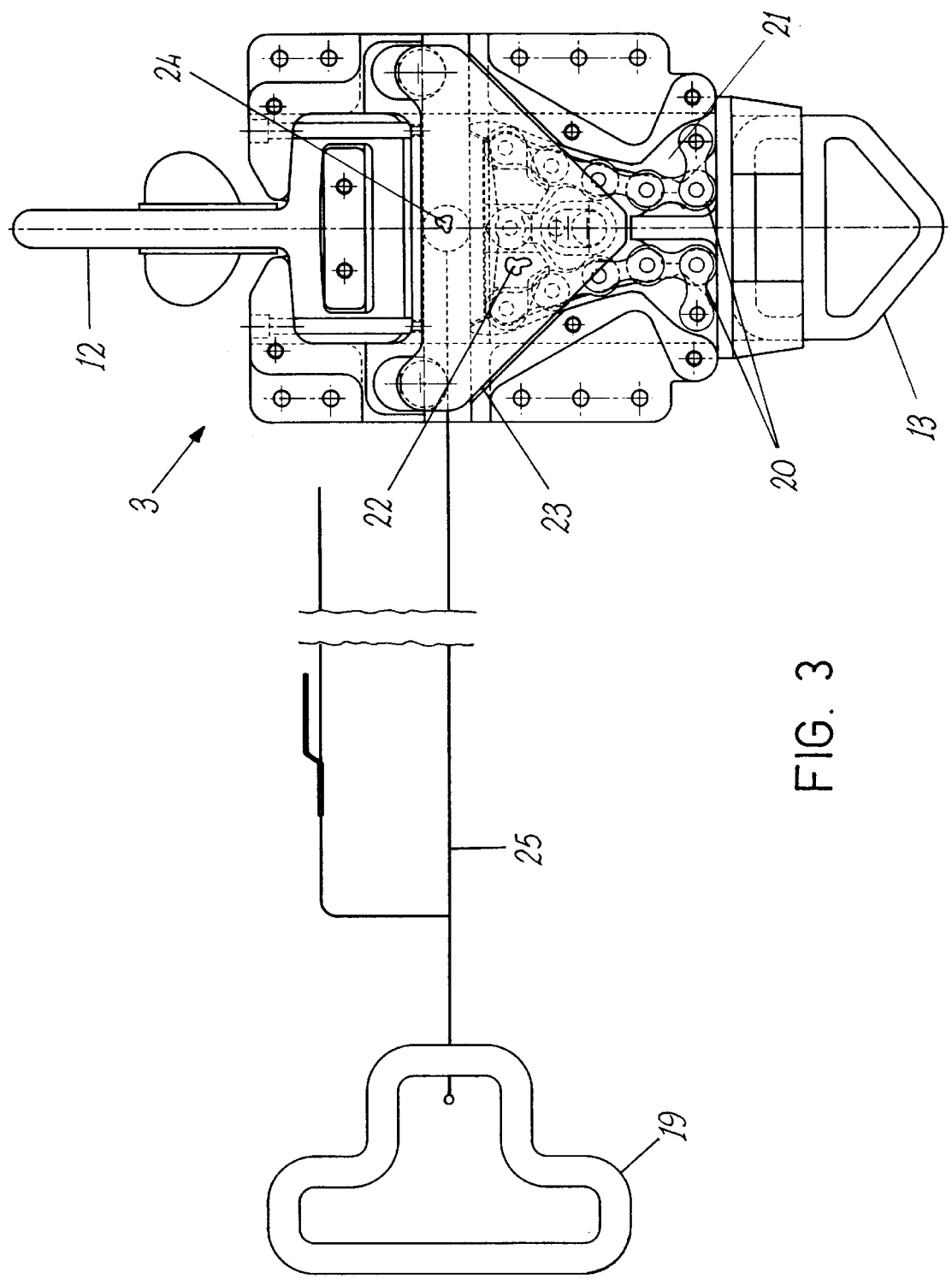
FIG. 3 is a schematic view of a first frontally provided dismountable link of the system according to the invention.

The preferred embodiment of the decomposable links illustrated in FIG. 3 provides the check of the buckle 13 comprised of two catenary branches 20, obliged to slide within a converging guide 21, and with the sliding retained by a couple of connecting rods 22 centrally hinged according to a dead point geometry.

The mechanism in a closure position is maintained in a safety condition by a triangular shaped floating plate 23, maintained into the position by a slider 24 which, in the central position prevents every motion.

The triangular plate 23 has three feeler pins engaging with the body of the links: two at the basis of the triangle are configured in such a way to intercept the slider 24 during its right and left translatory motion, and a central one controlling the closure position of the connecting rods 2 and defining the sliding trajectory of the two catenary branches 20.

Blocking of the plate 23 thus involves the blocking of the connecting rods 22 at the level of the hinge point and therefore the check of the buckle 13.

Traction of emergency handle 19 (directly connected by a sole cable 25 to two sliders 24 of the pair of links), beside the withdrawal of closure dowels of the outer housing 4 edges, provokes the translation of sliders 24 that, moving from the central position, disengage the locking of the floating plate 23, interfacing with one of the feeler pins (right or left) at the basis of the triangle, provoking the rotation of the plate 23 (rotation centre comprised of the feeler pin not engaged by the slider) with respect to the body of the link, and the active motion (by the central slider) of the central hinge of the connecting rods 22 from the dead point position.

Now, retention geometry becomes labile with the consequent sliding of the catenary branches 20 and the release of the buckle 13.

Disassembling of said link provokes the clearing of the over shoulder-straps 1 upon which it is inserted, which is thus dragged upward due to the traction of the main parachute.

In correspondence of the front terminal 5 of the over shoulder-strap 1 on the harness 2 is restrained on a metallic cable 26 sheathed within a bowden cable 27, fixed at the front band terminal of the over shoulder-strap 1.

The relative motion of the front terminal of the over shoulder-strap 1 with respect to the harness 2 thus determines the sliding of the metallic cable core 26 with respect to the sheath of the bowden cable 27.

These bowden cables 27 connect the front terminals 5 of the over shoulder-straps 1 to the respective rear terminals (particularly to the front terminal 5 of the right over shoulder-strap 1 with the rear terminal of the left over shoulder-strap and vice versa), in correspondence of the decomposable links 8 (see FIG. 4) connecting rear terminals of the over shoulder-straps 1 to the harness 2.

Said link 8 is comprised of a metallic body 28 where the shoulder bands of the harness are abutted and where a pin 29 having eccentric rests is housed, mounted on the rear band terminal of the over shoulder-strap 1.

The mounting position of said eccentric pin 29 is ensured by cylindrical floating dowels 30 kept into the seat by the peg assembly made up of the core 26 of the bowden cable 27.

Once said cable 26 is withdrawn from the seat, said blocking cylindrical dowels are released and the positioning of the eccentric pin 29 on the link body becomes labile allowing its disassembling, with the consequent release of the rear terminal of the shoulder-strap.

The mounting eccentricity of the pin 29 on the link 8 body allows a remarkable reduction of the withdrawal efforts of the metallic core 26 of the bowden cable 27 that can therefore occur without particular effort even in presence of important tractions actuated by the main parachute anchored to the over shoulder-straps.

The operation sequence of the system according to the invention described above with particular reference to a preferred embodiment in case of a bad working of the main parachute (partial opening or "flame" opening) can be summarized in the following on the basis of the kind of bad working.

a) Lack of Opening or Partial Opening of the Main Parachute

Main parachute, extracted by the restraint rope from the dorsal housing is not completely opened or even "flame" opened, e.g. due to the spinning of the shroud lines.

In this case, the parachutist operates on the suitable actuation handle 19 of the reserve parachute, provoking two different openings:

opening of the front edges of the outer housing 4;
opening of suitable decomposable links 3 rearly provided with respect to the housing 4, with the consequent release of two over shoulder-straps 1 above the harness 2 and the release of the main parachute.

Then, the sequence proceeds on by the distension of the double Y-shaped auxiliary harness 10 determining the clearing of the spring 17, which provides to eject the inner auxiliary housing 15 where the reserve parachute is folded, thus avoiding interference with the parachutist.

Progression of said distension drags upward the auxiliary housing 15, and thus the reserve parachute; in the meantime the shroud lines of the latter housed out of the housing 15 distends without particular interference, being the sliding of the ropes null with respect to the parachutist.

The completion of the distension of the shroud lines (clearing of the last two loops) provokes the opening of the auxiliary housing 15, freeing the reserve parachute canopy in an intermediate position between the main canopy and the parachutist, without any chance of interference that could obstruct the regular inflation.

Main parachute remains connected to the parachutist at the level of the ventral harnesses of the reserve parachute by the auxiliary harness 10 housed within the auxiliary housing 15 parallel with respect to the shroud lines of the reserve parachute.

b) Lack of Extraction of the Main Parachute

In case of lack of extraction of the main parachute due to the breaking of the aeroplane restraint rope, the above sequence cannot occur due to the lack of traction by the main parachute.

In this case, the actuation of the reserve parachute control simply provokes the opening of the edges of the outer housing 4 and with them the outcome of the pilot parachute 16 ejected by a suitable spring.

Said pilot parachute 16, which is connected to the apex of the canopy, thanks to the remarkable aerodynamic pressure due to a noticeable falling speed does not decelerate neither in case of a partial opening of the main parachute, is able to extract the sailage of the auxiliary inner housing 15 through the frontal opening.

Moreover, the auxiliary inner housing 15 remains anchored in its position within the outer housing 4, not having been actuated the clearing of the ejection spring 17 from the not-effected distension of the connection 10 of the main parachute.

In this situation of particularly bad complete functioning, the sequence proceeds on with a conventional extraction sequence of the reserve parachute by a pilot parachute; there are not interference risks with the main parachute, so that in this case (very rare) it is very high the reliability of the extraction system.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A system for the extraction and unfolding of a reserve parachute employable both for ventral and dorsal configuration and with and without assistance of a main parachute, comprising, first extraction means for forced extraction of the reserve parachute with assistance by the main parachute upon an extraction of the main parachute due to an anomalous situation arising, maintenance means to maintain the main parachute connected to the parachutist after an anomalous situation arising in said main parachute and the extraction of the main parachute due to the anomalous situation, said maintenance means being dimensioned and arranged to avoid interference with the reserve parachute, and second extraction means for a forced extraction and unfolding of the reserve parachute without assistance of an extracted main parachute which arises in a case of non-opening or failed extraction of the main parachute.

2. System for the extraction and unfolding of the reserve parachute according to claim 1, characterised in that said means to maintain the main parachute connected to the parachutist after an anomalous opening is comprised of a double Y-shaped auxiliary harness, which double Y-shaped design avoids interference with a canopy of the reserve parachute.

3. System for the extraction and unfolding of the reserve parachute according to claim 1, comprising a double housing system having an outer housing having edges that can be opened and a dismountable inner housing, with the inner housing containing the reserve parachute, said second extraction means including a pilot parachute and said inner housing being frontally opened to allow for an exiting of said reserve parachute from said inner housing by action of said pilot parachute.

4. System for the extraction and unfolding of the reserve parachute according to claim 3, characterised in that said double housing system allows for extraction of the reserve parachute from said inner housing by each of said first and second extraction means connected to said reserve parachute with said second extraction means including reserve parachute release, by way of a pilot parachute with extraction spring means, and with said first extraction means providing reserve parachute release by forced extraction of the inner housing actuated by the release and by the consequent dragging by the main parachute.

5. System for the extraction and unfolding of the reserve parachute according to claim 3, characterised in that said inner housing sustains a housing of shroud lines of said main parachute in such a way that the shroud lines during distension avoid sliding contact with respect to an extracting reserve parachute.

6. System for the extraction and unfolding of the reserve parachute according to claim 3, characterised in that, on said outer housing, control means are provided, operable by the parachutist, for activating a first pair of decomposable links, for providing for release of a main canopy of said main parachute and for an opening of the closure edges of said outer housing.

7. System for the extraction and unfolding of the reserve parachute according to claim 1, characterised in that said system further comprises a main harness which provides for suspension of the main parachute, through a series connection of counter shoulder-straps with an outer structure of the reserve parachute.

8. System for the extraction and unfolding of the reserve parachute according to claim 7, characterised in that said main harness includes removable counter shoulder-straps and said first extracting means includes means for allowing release of the main parachute by a single operation which initiates an opening of edges of the an outer housing by way of a first pair of decomposable links housed within the outer housing and, through release of front terminals of the counter shoulder-straps, an automatic activation of a second couple of rear decomposable links provided on the front terminals.

9. System for the extraction and unfolding of the reserve parachute according to claim 1, characterised in that said first extraction means includes a pair of decomposable links and a corresponding strap end buckle pair with said first pair of decomposable links being comprised of two catenary branches, obliged to slide within a converging guide, and a sliding hold for holding received strap end buckles, and said decomposable links further include a pair of connecting rods pivoted in a center location according to a dead point geometry; and said decomposable links further comprising triangularly shaped floating plates and sliders for maintaining said floating plates in position, and said sliders being positioned to prevent any motion in respective floating plates until released.

10. System for the extraction and unfolding of the reserve parachute according to claim 9, characterised in that each of said floating plates has three feeler pins engaging with a body of a respective one of said links.

11. System for the extraction and unfolding of the reserve parachute according to claim 8, characterised in that each one of said second pair of rear decomposable links is comprised of a metallic body against which shoulder bands of a main harness are abutted, and where an eccentric pin is housed, for mounting on a rear band terminal of a respective one of said shoulder-straps.

12. System for the extraction and unfolding of the reserve parachute according to claim 11, characterised in that the mounting position of said eccentric pin is ensured by floating cylindrical pegs controlled by a bowden cable system integrated with said shoulder-straps.

13. A parachute assembly, comprising:
a main harness for attachment to a parachutist;
a main parachute which is connected to said main harness at a first main harness connection location;
a reserve parachute which is connected to said main harness;
means for releasing said main parachute from said first main harness location to place said main parachute in an extraction mode;
first reserve parachute extraction means responsive to forces from said main parachute, while said main parachute is in said extraction mode for extracting the reserve parachute;
an auxiliary harness which maintains an interconnection between said main parachute and said main harness after said reserve parachute is extracted by said first reserve parachute extraction means;
second reserve parachute extraction means for extracting said reserve parachute free of assistance by said main parachute.

* * * * *